(12) United States Patent
Kuehl

(10) Patent No.: US 10,662,122 B2
(45) Date of Patent: May 26, 2020

(54) COMPOSITIONS AND METHODS FOR MICRONUTRIENT INTRODUCTION

(71) Applicant: WEST CENTRAL DISTRIBUTION, LLC, Willmar, MN (US)

(72) Inventor: Brian Kuehl, Horace, ND (US)

(73) Assignee: CHS Inc., Inver Grove Heights, MN (US)

(*) Notice: Subject to any disclaimer, the term of this patent is extended or adjusted under 35 U.S.C. 154(b) by 169 days.

(21) Appl. No.: 15/528,645

(22) PCT Filed: Nov. 30, 2015

(86) PCT No.: PCT/US2015/062948
§ 371 (c)(1),
(2) Date: May 22, 2017

(87) PCT Pub. No.: WO2016/089750
PCT Pub. Date: Jun. 9, 2016

(65) Prior Publication Data
US 2017/0267596 A1    Sep. 21, 2017

Related U.S. Application Data

(60) Provisional application No. 62/085,969, filed on Dec. 1, 2014.

(51) Int. Cl.
*C05B 13/06* (2006.01)
*C05D 9/02* (2006.01)
(Continued)

(52) U.S. Cl.
CPC ............ *C05B 13/06* (2013.01); *C05D 9/02* (2013.01); *C05G 3/0058* (2013.01); *C05D 9/00* (2013.01); *C05F 11/00* (2013.01)

(58) Field of Classification Search
CPC ........ C05B 13/06; C05G 3/0058; C05D 9/02; C05D 9/00; C05F 11/00
See application file for complete search history.

(56) References Cited

U.S. PATENT DOCUMENTS 2,828,182 A    3/1958   Cheronis et al.
3,493,992 A    2/1970   Garetto et al.
(Continued)

FOREIGN PATENT DOCUMENTS

ES    2110894         2/1998
ES    2110894 A1 *    2/1998
(Continued)

OTHER PUBLICATIONS

Liquid Products LLC. "Ammonium Polyphosphate Solution 10-34-0" Spec Sheet <http://www.liquidproducts.net/SpecSheets/10-34-0_spec_shet.pdf> Feb. 2006.*
(Continued)

*Primary Examiner* — Jennifer A Smith
(74) *Attorney, Agent, or Firm* — Barnes & Thornburg LLP

(57) ABSTRACT

The present disclosure provides compositions comprising a ligand and a fertilizer, including kits comprising the ligand. The disclosure also provides method of growing a plant, wherein the method comprises the step of contacting the plant with a composition comprising a ligand.

8 Claims, 9 Drawing Sheets

(51) Int. Cl.
*C05G 3/00* (2020.01)
*C05D 9/00* (2006.01)
*C05F 11/00* (2006.01)

(56) References Cited

U.S. PATENT DOCUMENTS

| | | | | |
|---|---|---|---|---|
| 3,558,786 | A * | 1/1971 | McCarty | A23K 20/111 514/566 |
| 3,981,712 | A * | 9/1976 | Petree | C05D 9/02 71/1 |
| 6,331,198 | B1 | 12/2001 | Puttan et al. | |
| 6,346,131 | B1 | 2/2002 | Bergevin | |
| 6,881,706 | B1 * | 4/2005 | Gustavsson | A01N 25/30 424/405 |
| 2006/0142158 | A1 | 6/2006 | Nonomura | |
| 2008/0196742 | A1 * | 8/2008 | Beck | C11D 3/06 134/1.3 |
| 2010/0029477 | A1 | 2/2010 | McLaughlin et al. | |

FOREIGN PATENT DOCUMENTS

| | | |
|---|---|---|
| GB | 1308614 | 2/1973 |
| WO | 2005/095305 | 10/2005 |
| WO | 2007/068348 | 6/2007 |
| WO | 2009/042811 | 4/2009 |

OTHER PUBLICATIONS

Ammonium Polyphosphate 10-34-0 Safety Data Sheet. Federal Register / vol. 77, No. 58 / Monday, Mar. 26, 2012 / Rules and Regulations <msds.simplot.com/datasheets/14090.pdf>.*
Linden, Jackie. "Chelated Trace Minerals Benefit Layer Performance". The Poultry Site <https://thepoultrysite.com/articles/chelated-trace-minerals-benefit-layer-performance> pp. 1-9. Nov. 30, 2013.*
West Central Distribution. "Soyshot". Product Label. Sep. 2016.*
Aboulroos, Samir A. "Reaction of EDTA, DTPA, and EDDHA complexes of zinc, copper, and manganese with a calcareous soil." Zeitschrift für Pflanzenernährung und Bodenkunde 144.2 (1981): 164-173.*
Deretil Agronutritional. "OligoActiv EDDHA Zn". <http://www.deretilagronutritional.com/index.php/es/productos/oligoactiv> Feb. 16, 2013.*
López-Rayo, Sandra, Covadonga Correas, and Juan J. Lucena. "Novel chelating agents as manganese and zinc fertilisers: characterisation, theoretical speciation and stability in solution." Chemical Speciation & Bioavailability 24.3 (2012): 147-158.*
Tiffin, Lee O., John C. Brown, and Robert W. Krauss. "Differential absorption of metal chelate components by plant roots." Plant physiology 35.3 (1960): 362.*
Extended European Search Report, prepared for EP15864582, dated Jun. 14, 2018.
PCT Search Report and Written Opinion for PCT/US2015/062948, completed Jan. 15, 2016.

* cited by examiner

COMPOSITIONS AND METHODS FOR MICRONUTRIENT INTRODUCTION

CROSS-REFERENCE TO RELATED APPLICATIONS

This application is the U.S. national phase of PCT/US2015/062948, filed on Nov. 30, 2015, and claims the benefit under 35 USC § 119(e) of U.S. Provisional Application Ser. No. 62/085,969, filed on Dec. 1, 2014, the entire disclosures of which are incorporated herein by reference.

TECHNICAL FIELD

The invention described herein pertains to composition and methods, and uses thereof, for introducing micronutrients into plants. In particular, the invention described herein pertains to compounds including a ligand and optionally a fertilizer, and methods and uses thereof, for improving agricultural productivity.

BACKGROUND AND SUMMARY OF THE INVENTION

The production and development of plants and plant products for agricultural use are important concerns for the growing world. As plant products are utilized not only as human foods but also as animal feeds and as fuels, and given that the worldwide human population has been estimated to exceed 9 billion people by the year 2050, the necessity to increase the efficiency and productivity of agricultural processes is more important than ever.

Modern agriculture has developed a number of processes to assist with increasing productivity of plants and plant products. For example, the use of improved mechanization, advanced fertilizers, and high-quality hybrid seeds can all contribute to increasing productivity by improving the yield of plants grown per unit of land. However, despite these advances, new solutions to solve the problems of producing and developing plant products are still needed to further improve agricultural productivity.

Accordingly, the present disclosure provides compositions and methods comprising ligands that exhibit desirable properties and provide related advantages for improving agricultural productivity.

The compositions and methods utilizing compositions comprising a ligand according to the present disclosure provide several advantages compared to other methods known in the art. First, the compositions comprising a ligand are effective to increase yield of a plant (e.g., number of bushels) produced per acre of land. Second, the compositions comprising a ligand are able to employ existing micronutrients in the soil that are typically underutilized by plants. It is believed that the compositions comprising a ligand are able to chelate with the existing micronutrients, allowing the micronutrients to be available for uptake by the plants.

Third, the compositions are able to chelate micronutrients in a fertilizer formulation that are typically not able to be fully chelated, thus improving the availability of the micronutrients for plant uptake. For example, the fertilizer formulation can be a tank mixed formulation that can be easily employed for utilization by the end user.

Fourth, by chelating with micronutrients in the soil or in fertilizer formulations, the compositions prevent the micronutrients from interacting with phosphorus, thereby indirectly increasing the availability of phosphorus to plants. Furthermore, the micronutrients are able to more efficiently enter the plant and are transported to the cellular level, thus assuring their availability to the plant cells.

Figure 1:
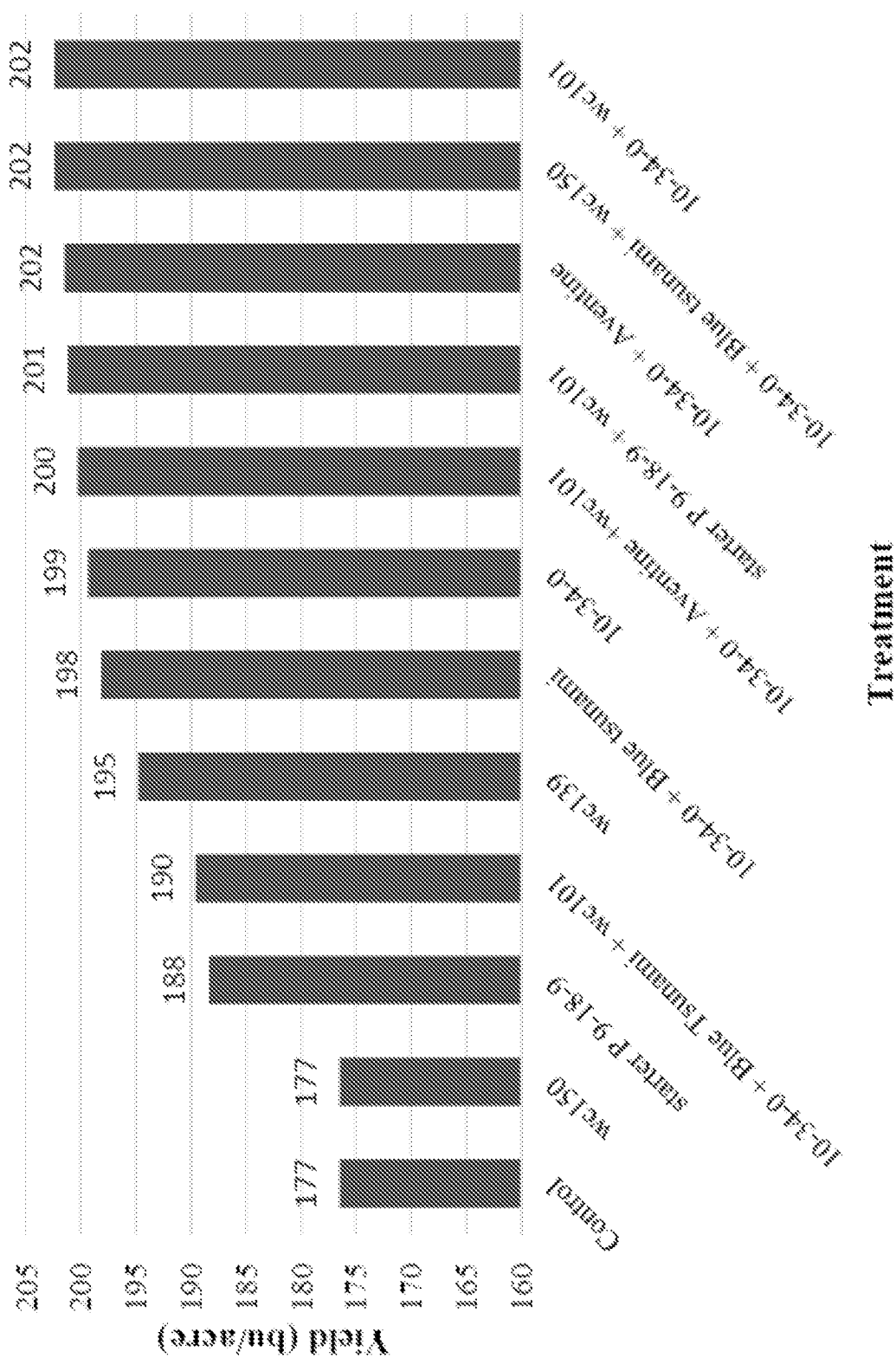
FIG. 1 shows the yield response (bushels/acre) to starter fertilizer treatment groups, sorted by yield level.

The following numbered embodiments are contemplated and are non-limiting:

1. A composition comprising a ligand and a fertilizer.
2. The composition of clause 1 wherein the composition is substantially free of iron.
3. The composition of clause 1 or clause 2 wherein the composition is substantially free of a metal.
4. The composition of clause 3 wherein the ligand is a metal chelating agent.
5. The composition of clause 3 wherein the metal is iron.
6. The composition of any of clauses 1 to 5 wherein the ligand is non-chelated.
7. The composition of any of clauses 1 to 6 wherein the ligand is substantially free of a metal.
8. The composition of clause 7 wherein the ligand is a metal chelating agent.
9. The composition of clause 8 wherein the metal is iron.
10. The composition of any of clauses 1 to 9 wherein the ligand is of the formula

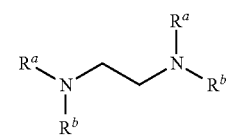

or a salt thereof,
wherein
$R^a$ is independently selected in each instance from the group consisting of H, —CH$_2$CO$_2$H or a salt thereof, and —CH$_2$CH$_2$OH;

$R^b$ is independently selected in each instance from the group consisting of —CH$_2$CH$_2$OH, —CH$_2$CO$_2$H, or a salt thereof, and

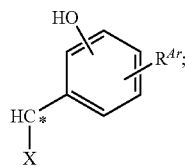

wherein the asterisk indicates the point of attachment, X is independently selected in each instance from the group consisting of H, —CO$_2$H, or a salt thereof, and —CH$_2$OH;

$R^{Ar}$ represents from 0 to 2 substituents independently selected in each instance from the group consisting of F, Cl, —OH, —NH$_2$, —CH$_3$, —CN, —CO$_2$H, or a salt thereof, —C(O)NH$_2$, —SO$_3$H, or a salt thereof, —SO$_2$NH$_2$, —PO$_3$H$_2$, or a salt thereof, and OR$^1$, where R$^1$ is C$_1$-C$_4$ alkyl; and the ligand includes two or more carboxylic acid groups other than $R^{Ar}$.

11. The composition of clause 10 wherein each $R^a$ is identical and each $R^b$ is identical.

12. The composition of clause 10 or 11 wherein $R^a$ is not identical to W.

13. The composition of clause 10 or 11 wherein $R^a$ is identical to $R^b$.

14. The composition of any of clauses 1 to 13 wherein the ligand is ethylenediamine-N,N'-bis(2-hydroxyphenylacetic acid) (EDDHA).

15. The composition of any of clauses 1 to 14 wherein the ligand is ortho-ortho EDDHA.

16. The composition of any of clauses 1 to 15 wherein the composition further comprises zinc.

17. The composition of clause 16 wherein the zinc is chelated zinc. 18. The composition of any of clauses 1 to 17 wherein the composition further comprises a herbicide.

19. The composition of any of clauses 1 to 18 wherein the composition further comprises a water conditioning agent.

20. The composition of any of clauses 1 to 19 wherein the composition further comprises a micronutrient product.

21. The composition of any of clauses 1 to 20 wherein the fertilizer is an ammonium polyphosphate fertilizer.

22. The composition of clause 21 wherein the ammonium polyphosphate fertilizer is ammonium polyphosphate 10-34-0 fertilizer.

23. The composition of any of clauses 1 to 22 wherein the herbicide is glyphosate.

24. A composition consisting essentially of a ligand and a fertilizer.

25. The composition of any of clauses 1 to 24 wherein the ligand is non-chelated.

26. The composition of any of clauses 1 to 25 wherein the fertilizer is an ammonium polyphosphate fertilizer.

27. The composition of clause 26 wherein the ammonium polyphosphate fertilizer is ammonium polyphosphate 10-34-0 fertilizer.

28. A method of growing a plant, said method comprising the step of contacting the plant with a composition comprising a ligand.

29. The method of clause 28 wherein the yield of the plant is improved via contacting the plant with the composition.

30. The method of clause 28 or clause 29 wherein the composition is substantially free of iron.

31. The method of any of clauses 28 to 30 wherein the composition is substantially free of a metal.

32. The method of any of clauses 28 to 31 wherein the ligand is a metal chelating agent.

33. The method of clause 32 wherein the metal is iron.

34. The method of any of clauses 28 to 33 wherein the ligand is non-chelated.

35. The method of any of clauses 28 to 34 wherein the ligand is substantially free of a metal.

36. The method of clause 35 wherein the ligand is a metal chelating agent.

37. The method of clause 36 wherein the metal is iron.

38. The method of any of clauses 28 to 37 wherein the ligand is of the formula

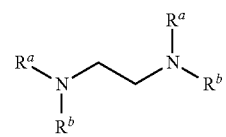

or a salt thereof,
wherein $R^a$ is independently selected in each instance from the group consisting of H, —CH$_2$CO$_2$H or a salt thereof, and —CH$_2$CH$_2$OH;

$R^b$ is independently selected in each instance from the group consisting of —CH$_2$CH$_2$OH, —CH$_2$CO$_2$H, or a salt thereof, and

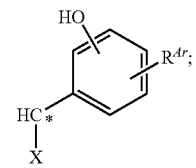

wherein the asterisk indicates the point of attachment, X is independently selected in each instance from the group consisting of H, —CO$_2$H, or a salt thereof, and —CH$_2$OH;

$R^{Ar}$ represents from 0 to 2 substituents independently selected in each instance from the group consisting of F, Cl, —OH, —NH$_2$, —CH$_3$, —CN, —CO$_2$H, or a salt thereof, —C(O)NH$_2$, —SO$_3$H, or a salt thereof, —SO$_2$NH$_2$, —PO$_3$H$_2$, or a salt thereof, and OR$^1$, where R$^1$ is C$_1$-C$_4$ alkyl; and the ligand includes two or more carboxylic acid groups other than $R^{Ar}$.

39. The method of clause 38 wherein each $R^a$ is identical and each $R^b$ is identical.

40. The method of clause 38 or 39 wherein $R^a$ is not identical to $R^b$.

41. The method of clause 38 or 39 wherein $R^a$ is identical to $R^b$.

42. The method of any of clauses 28 to 41 wherein the ligand is ethylenediamine-N,N'-bis(2-hydroxyphenylacetic acid) (EDDHA).

43. The method of any of clauses 28 to 42 wherein the ligand is ortho-ortho EDDHA.

44. The method of any of clauses 28 to 43 wherein the ligand is non-chelated.

45. The method of any of clauses 28 to 44 wherein the composition further comprises a fertilizer.

46. The method of any of clauses 28 to 45 wherein the composition further comprises zinc.

47. The method of clause 46 wherein the zinc is chelated zinc.

48. The method of any of clauses 28 to 47 wherein the composition further comprises a herbicide.

49. The method of any of clauses 28 to 48 wherein the composition further comprises a water conditioning agent.

50. The method of any of clauses 28 to 49 wherein the composition further comprises a micronutrient product.

51. The method of any of clauses 28 to 50 wherein the composition consists essentially of the ligand and the fertilizer.

52. The method of any of clauses 28 to 51 wherein the fertilizer is an ammonium polyphosphate fertilizer.

53. The method of clause 52 wherein the ammonium polyphosphate fertilizer is ammonium polyphosphate 10-34-0 fertilizer.

54. The method of any of clauses 28 to 53 wherein the herbicide is glyphosate.

55. The method of any of clauses 28 to 54 wherein the plant is a seed.

56. The method of any of clauses 28 to 55 wherein the plant is corn.

57. The method of any of clauses 28 to 55 wherein the plant is soybean.

58. A kit comprising a ligand and instructions for combining the ligand with a fertilizer.

59. The kit of clause 58 wherein the ligand is non-chelated.

60. The kit of clause 58 or clause 59 wherein the ligand is substantially free of a metal.

61. The kit of clause 60 wherein the ligand is a metal chelating agent.

62. The kit of clause 60 wherein the metal is iron.

63. The kit of any of clauses 58 to 62 wherein the ligand is of the formula

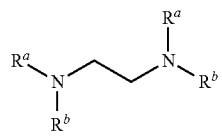

or a salt thereof,
wherein $R^a$ is independently selected in each instance from the group consisting of H, —$CH_2CO_2H$ or a salt thereof, and —$CH_2CH_2OH$;

$R^b$ is independently selected in each instance from the group consisting of —$CH_2CH_2OH$, —$CH_2CO_2H$, or a salt thereof, and

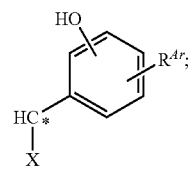

wherein the asterisk indicates the point of attachment, X is independently selected in each instance from the group consisting of H, —$CO_2H$, or a salt thereof, and —$CH_2OH$;

$R^{Ar}$ represents from 0 to 2 substituents independently selected in each instance from the group consisting of F, Cl, —OH, —$NH_2$, —$CH_3$, —CN, —$CO_2H$, or a salt thereof, —C(O)$NH_2$, —$SO_3H$, or a salt thereof, —$SO_2NH_2$, —$PO_3H_2$, or a salt thereof, and $OR^1$, where $R^1$ is $C_1$-$C_4$ alkyl; and the ligand includes two or more carboxylic acid groups other than $R^{Ar}$.

64. The kit of clause 63 wherein each $R^a$ is identical and each $R^b$ is identical.

65. The kit of clause 63 or 64 wherein $R^a$ is not identical to $R^b$.

66. The kit of clause 63 or 64 wherein $R^a$ is identical to $R^b$.

67. The kit of any of clauses 58 to 66 wherein the ligand is ethylenediamine-N,N'-bis(2-hydroxyphenylacetic acid) (EDDHA).

68. The kit of any of clauses 58 to 67 wherein the ligand is ortho-ortho EDDHA.

69. The kit of any of the above clauses wherein the composition further comprises zinc.

70. The kit of clause 69 wherein the zinc is chelated zinc.

71. The kit of any of clauses 58 to 70 wherein the composition further comprises a herbicide.

72. The kit of any of clauses 58 to 71 wherein the composition further comprises a water conditioning agent.

73. The kit of any of clauses 58 to 72 wherein the composition further comprises a micronutrient product.

74. The kit of any of clauses 58 to 73 wherein the fertilizer is an ammonium polyphosphate fertilizer.

75. The kit of clause 74 wherein the ammonium polyphosphate fertilizer is ammonium polyphosphate 10-34-0 fertilizer.

76. The kit of any of clauses 58 to 75 wherein the herbicide is glyphosate.

DETAILED DESCRIPTION

Various aspects of the invention are described herein as follows. In one aspect described herein, a composition comprising a ligand and a fertilizer is provided. In another aspect, a composition consisting essentially of a ligand and a fertilizer is provided. In yet another aspect, a method of growing a plant is provided. The method comprises the step of contacting the plant with a composition comprising a ligand. In another aspect, a kit is provided. The kit comprises a ligand and instructions for combining the ligand with a fertilizer.

In some aspects, a composition comprising a ligand and a fertilizer is provided. As used herein, the term "ligand" refers to a chelating agent capable of forming chelation compounds with various substances. In some embodiments, the ligand is selected from a group consisting of ethylenediamine-N,N'-bis(2-hydroxyphenylacetic acid) (EDDHA), ethylenediaminedi(2-hydroxy-5-sulfophenylacetic) acid (EDDHSA), ethylenediaminetetraacetic acid (EDTA), N-{2-[Bis(carboxymethyl)amino]ethyl}-N-(2-hydroxyethyl)glycine (HEDTA), N,N-Bis{2-[bis(carboxymethyl)amino]ethyl}glycine (DTPA), ethylenediaminedi(o-hydroxy-p-methylphenylacetic) acid (EDDHMA), ethylenediaminedi(5-carboxy-2-hydroxyphenylacetic) acid (EDDCHA), [Ethylenebis(2-hydroxybenzylimino)]diacetic acid (HBED), and glucoheptonate (GH).

In various embodiments, the ligand is of the formula

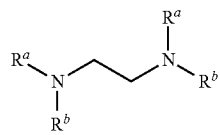

or a salt thereof,
wherein
$R^a$ is independently selected in each instance from the group consisting of H, —$CH_2CO_2H$ or a salt thereof, and —$CH_2CH_2OH$;
$R^b$ is independently selected in each instance from the group consisting of —$CH_2CH_2OH$, —$CH_2CO_2H$, or a salt thereof, and

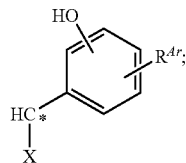

wherein the asterisk indicates the point of attachment, X is independently selected in each instance from the group consisting of H, —$CO_2H$, or a salt thereof, and —$CH_2OH$;
$R^{Ar}$ represents from 0 to 2 substituents independently selected in each instance from the group consisting of F, Cl, —OH, —$NH_2$, —$CH_3$, —CN, —$CO_2H$, or a salt thereof, —$C(O)NH_2$, —$SO_3H$, or a salt thereof, —$SO_2NH_2$, —$PO_3H_2$, or a salt thereof, and $OR^1$, where $R^1$ is $C_1$-$C_4$ alkyl; and
the ligand includes two or more carboxylic acid groups other than $R^{Ar}$. In some embodiments of the composition, each $R^a$ is identical and each $R^b$ is identical in the ligand. In other embodiments of the composition, $R^a$ is not identical to $R^b$ in the ligand. In yet other embodiments of the composition, $R^a$ is identical to $R^b$ in the ligand.

In various embodiments, the ligand is EDDHA. The chemical structure of EDDHA is:

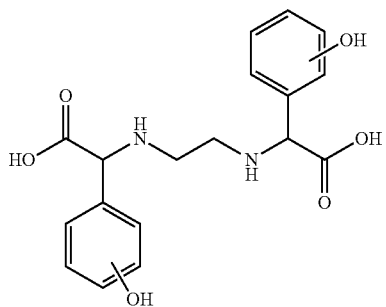

In some embodiments, the ligand is ortho-ortho EDDHA. The chemical structure of ortho-ortho EDDHA is:

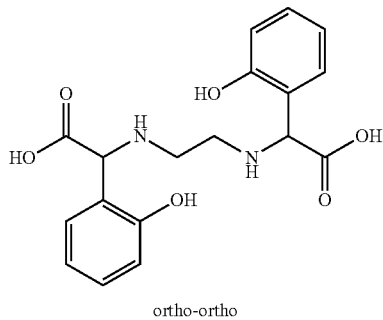 [SMILES: O=C(O)C(NCCNC(C(=O)O)c1ccccc1O)c1ccccc1O]

ortho-ortho

In some embodiments, the ligand is EDDHSA. In other embodiments, the ligand is EDTA. In yet other embodiments, the ligand is HEDTA. In some embodiments, the ligand is DTPA. In other embodiments, the ligand is EDDHMA. In yet other embodiments, the ligand is EDDCHA. In some embodiments, the ligand is HBED. In other embodiments, the ligand is GH.

As used herein, the term "fertilizer" refers to any organic or inorganic material, of natural or of synthetic origin, which may be added to soil to supplement one or more plant nutrients that aid in the growth of plants. As known to the skilled artisan, a fertilizer can be custom blended according to the need and desire of a plant producer. Fertilizer blends comprising various combinations of elements and materials can be easily envisioned by the skilled artisan.

In various embodiments, the fertilizer is an ammonium polyphosphate fertilizer. The term "ammonium phosphate fertilizer" can comprise any of a wide variety of phosphates, such as orthophosphate, pyrophosphate, tripolyphosphate, tetrapolyphosphate, trimetaphosphate, and the like, and mixtures thereof, and one or more ammonium counterions. In some embodiments, the phosphate comprises a polyphosphate. In other embodiments, the phosphate comprises an orthophosphate. In some embodiments, the ammonium phosphate fertilizer comprises monoammonium phosphate. In other embodiments, the ammonium phosphate fertilizer comprises diammonium phosphate. In yet other embodiments, the ammonium phosphate fertilizer comprises ammonium polyphosphate. In other embodiments, the ammonium phosphate fertilizer comprises ammonium orthophosphate. In some embodiments, the fertilizer is a liquid fertilizer. In other embodiments, the fertilizer is a non-liquid fertilizer.

In some embodiments, the fertilizer is a fertilizer selected from the group consisting of 10-34-0, 7-21-7, and 4-10-10. In some embodiments, the fertilizer is derived from 10-34-0 fertilizer further comprising soluble potash (for supplying potassium (K)). In other embodiments, the fertilizer is a fertilizer selected from the group consisting of 9-18-9, 6-24-6, and 4-18-18. In some embodiments, the fertilizer is derived from phosphoric acid. In yet other embodiments, the fertilizer is a fertilizer selected from the group consisting of 7-23-3, 7-25-5, and 6-22-10. In some embodiments, the fertilizer is produced from a combination of high ortho acid and high poly acid. In one embodiment, the fertilizer is 10-34-0. In another embodiment, the fertilizer is 7-21-7. In yet another embodiment, the fertilizer is 4-10-10. In one embodiment, the fertilizer is 9-18-9. In another embodiment, the fertilizer is 6-24-6. In yet another embodiment, the fertilizer is 4-18-18. In one embodiment, the fertilizer is 7-23-3. In another embodiment, the fertilizer is 7-25-5. In yet another embodiment, the fertilizer is 6-22-10.

In some embodiments, the composition is substantially free of iron. In other embodiments, the composition is substantially free of a metal.

In certain embodiments, the ligand is a metal chelating agent. In some embodiments, the metal is iron.

In other embodiments, the ligand is non-chelated. As used herein, the term "chelated" or "chelation" refers to the formation or presence of one or more bonds, or other attractive interactions, between two or more separate binding sites within a ligand and a single central atom.

In yet other embodiments, the ligand is substantially free of a metal. In some embodiments, the ligand is a metal chelating agent. In certain embodiments, the metal is iron.

In certain embodiments, the composition further comprises zinc. In some embodiments, the zinc is chelated zinc. Any zinc-containing product can be used according to these embodiments. In some embodiments, zinc may be provided by one or more of the following zinc-containing products: Nortrace EDTA 9% Zinc, Foli-Gro Zinc 10%, Pro-Zinc 10, RNA EDTA 9% Zinc, Tracite LF Zinc 10%, Ultra Che Zinc 9% EDTA, Zinc Gro 10 Liquid, Citri Che Zinc 10% EDTA. In one embodiment, zinc is provided by Nortrace EDTA 9% Zinc. In another embodiment, zinc is provided by Foli-Gro Zinc 10%. In yet another embodiment, zinc is provided by Pro-Zinc 10. In one embodiment, zinc is provided by RNA EDTA 9% Zinc. In another embodiment, zinc is provided by Tracite LF Zinc 10%. In yet another embodiment, zinc is provided by Ultra Che Zinc 9% EDTA. In one embodiment, zinc is provided by Zinc Gro 10 Liquid. In another embodiment, zinc is provided by *Citri* Che Zinc 10% EDTA.

In various embodiments, the composition further comprises a herbicide. As used herein, the term "herbicide" refers to a molecule or combination of molecules that retards or otherwise kills undesirable, unwanted plants; such as, but not limited to, deleterious or annoying weeds, broadleaf plants, grasses, and sedges; and may be used in this manner for crop protection. Numerous herbicides are known in the art including, for example, those available at http://www.alanwood.net/pesticides/class_pesticides.html. In various embodiments, the herbicide is selected from the group consisting of 2,4-D, 2,4-DB, acetochlor, acifluorfen, alachlor, ametryn, atrazine, aminopyralid, benefin, bensulfuron, bensulide, bentazon, bromacil, bromoxynil, butylate, carfentrazone, chlorimuron, chlorsulfuron, clethodim, clomazone, clopyralid, cloransulam, cycloate, DCPA, desmediphan, dicamba, dichlobenil, diclofop, diclosulam, diflufenzopyr, dimethenamid, diquat, diuron, DSMA, endothall, EPTC, ethalfluralin, ethofumesate, fenoxaprop, fluazifop-P, flucarbazone, flufenacet, flumetsulam, flumiclorac, flumioxazin, fluometuron, fluroxypyr, fomesafen, foramsulfuron, glufosinate, glyphosate, halosulfuron, hexazinone, imazamethabenz, imazamox, imazapic, imazaquin, imazethapyr, isoxaben, isoxaflutole, lactofen, linuron, MCPA, MCPB, mesotrione, metolachlor-s, metribuzin, metsulfuron, molinate, MSMA, napropamide, naptalam, nicosulfuron, norflurazon, oryzalin, oxadiazon, oxyfluorfen, paraquat, pelargonic acid, pendimethalin, phenmedipham, picloram, primisulfuron, prodiamine, prometryn, pronamide, propanil, prosulfuron, pyrazon, pyrithiobac, quinclorac, quizalofop, rimsulfuron, sethoxydim, siduron, simazine, sulfentrazone, sulfometuron, sulfosulfuron, tebuthiuron, terbacil, thiazopyr, thifensulfuron, thiobencarb, tralkoxydim, triallate, triasulfuron, tribenuron, triclopyr, trifluralin, triflusulfuron, and any combination thereof. In some embodiments, the herbicide is glyphosate.

In some embodiments, the composition further comprises a water conditioning agent. As used herein, the term "water conditioning agent" refers to any substance that improves or enhances herbicide and/or pesticide performance. For example, a water conditioning agent can enhance pesticide performance by modifying factors such as pH and hard water, enhance herbicide uptake by plants, and improve pesticide spray application and efficacy.

In other embodiments, the composition further comprises a micronutrient product. For example, micronutrient products can include trace elements such as copper, iron, manganese, zinc, cobalt, molybdenum, and/or boron. These trace elements can be referred to as "micronutrients" because of the relatively small amounts required by plants for growth. In some embodiments, a micronutrient product is selected from Max In Ultra ZMB, First Choice Foliar Nutrient, Foli Gro, Versa Max Soybean, Versa Max Corn, Ultra Che Corn Mix EDTA, ManniPlex for Beans, ManniPlex for Corn, Tracite LF Row Crop Mix, and KickStand Micro Mix. In one embodiment, the micronutrient product is Max In Ultra ZMB. In another embodiment, the micronutrient product is First Choice Foliar Nutrient. In yet another embodiment, the micronutrient product is Foli Gro. In one embodiment, the micronutrient product is Versa Max Soybean. In another embodiment, the micronutrient product is Versa Max Corn. In yet another embodiment, the micronutrient product is Ultra Che Corn Mix EDTA. In one embodiment, the micronutrient product is ManniPlex for Beans. In another embodiment, the micronutrient product is ManniPlex for Corn. In yet another embodiment, the micronutrient product is Tracite LF Row Crop Mix. In one embodiment, the micronutrient product is KickStand Micro Mix.

In various embodiments, the composition comprises a ligand and a fertilizer at specified ratios, for example volume/volume (v/v) ratios. In some embodiments, the ratio of ligand to fertilizer is about 8-64 fluid ounces (fl. oz.) of ligand to about 1-10 gallons of fertilizer. In other embodiments, the ratio of ligand to fertilizer is about 8-32 fl. oz. to about 1-5 gallons of fertilizer. In yet other embodiments, the ratio of ligand to fertilizer is about 32-64 fl. oz. to about 5-10 gallons of fertilizer.

In some embodiments, the ratio of ligand to fertilizer is about 8 fl. oz. of ligand to about 1 gallons of fertilizer. In other embodiments, the ratio of ligand to fertilizer is about 32 fl. oz. to about 5 gallons of fertilizer. In yet other embodiments, the ratio of ligand to fertilizer is about 64 fl. oz. to about 10 gallons of fertilizer.

In other aspects, a composition consisting essentially of a ligand and a fertilizer is provided. The various embodiments described with respect to the composition comprising a ligand and a fertilizer are also applicable to the composition consisting essentially of a ligand and a fertilizer.

In other aspects, a method of growing a plant is provided. The method comprises the step of contacting the plant with a composition comprising a ligand. The various embodiments described with respect to the composition comprising a ligand and a fertilizer are also applicable to the methods of growing a plant.

As used herein, the term "plant" refers to whole plants, plant organs (e.g., leaves, stems, roots, etc.), seeds, plant cells, propagules, embryos, and progeny of the same. In some embodiments, the plant is a whole plant. In other embodiments, the plant is a plant organ. In yet other embodiments, the plant is a seed. In some embodiments, the plant is a plant cell. Plant cells can be differentiated or undifferentiated (e.g., callus, suspension culture cells, protoplasts, leaf cells, root cells, phloem cells, and pollen). In other embodiments, the plant is a propagule. In yet other embodiments, the plant is an embryo. In some embodiments, the plant is a plant progeny.

In some embodiments, the yield of the plant is improved via contacting the plant with the composition. For example, the improvement in yield can be an improvement of the quantity of the plant (e.g., number of bushels) produced per unit land measurement (e.g., acre or hectare) compared to a yield observed without contacting plants with the composition. In another exemplary embodiment, the improvement in yield can be a percentage improvement in the quantity of the plant produced per unit of land measurement compared to a yield observed without contacting plants with the composition.

In some embodiments, the emergence of plants from seeds is improved via contacting the plant with the composition. For example, the improvement in emergence can be evaluated based on the percentage of emergence of plant from seeds compared to emergence observed without contacting seeds with the composition.

In various embodiments, the plant is corn (maize). In other embodiments, the plant is soybean. In yet other embodiments, the plant is wheat. In some embodiments, the plant is sugarbeet. In various embodiments, the plant is a bean. In other embodiments, the bean is a dry edible bean. In yet other embodiments, the plant is sorghum. In some embodiments, the sorghum is grain sorghum. In various embodiments, the plant is cotton. In other embodiments, the plant is potato. In some embodiments, the plant is barley. In other embodiments, the plant is sunflower.

In another aspect, a kit is provided. The kit comprises a ligand as described herein. In this embodiment, the kit can further comprise instructions for use, such as for combining the ligand with a fertilizer, such as via tankmixing. The various embodiments described with respect to the composition comprising a ligand and a fertilizer are also applicable to the kits described herein.

While the invention is susceptible to various modifications and alternative forms, specific embodiments are herein described in detail. It should be understood, however, that there is no intent to limit the invention to the particular forms described, but on the contrary, the intention is to cover all modifications, equivalents, and alternatives falling within the scope of the invention.

EXAMPLE 1

Exemplary Ligands

For the examples disclosed herein, the compositions comprised ortho-ortho EDDHA as the exemplary ligand. The ortho-ortho EDDHA was obtained from JAER (Laboratorio Jaer, S.A.) in Barcelona, Spain and was utilized in the compositions according to following exemplary embodiments.

EXAMPLE 2

2012 Corn Trial—St. Cloud, Minn.

A corn trial utilizing a composition of the instant disclosure was performed in St. Cloud, Minn., in 2012. In this example, the composition comprised ortho-ortho EDDHA as the exemplary ligand.

In this example, *Zea mays* (variety DKC 43-48) seeds were planted on May 15, 2012. Soil moisture was normal and the seed bed was compacted. The tillage type was conventional till. The treated crop area for the instant example was 300 square feet ($ft^2$). The study design was randomized complete block (RCB) with four replications. A total of 13 treatments were performed, as shown in Table 1.

TABLE 1

Treatment Descriptions.

| Treatment No. | Type | Treatment Name | Rate | Unit | Description |
|---|---|---|---|---|---|
| 1 | FERT | 10-34-0 | 6 | gal/a | In Furrow |
| 2 | FERT | 10-34-0 | 5.75 | gal/a | In Furrow |
|   | FERT | EBMix | 1 | qt/a | In Furrow |
| 3 | FERT | 10-34-0 | 5.75 | gal/a | In Furrow |
|   | FERT | Blue Tsunami | 1 | qt/a | In Furrow |
| 4 | FERT | Redline | 3 | gal/a | In Furrow |
|   | FERT | Water | 3 | gal/a | In Furrow |
| 5 | FERT | Redline | 3 | gal/a | In Furrow |
|   | FERT | Water | 2.9 | gal/a | In Furrow |
|   | FERT | Torque HC | 1 | oz/a | In Furrow |
| 6 | FERT | Redline | 3 | gal/a | In Furrow |
|   | FERT | 10-34-0 | 3 | gal/a | In Furrow |
| 7 | FERT | Water | 5.9 | gal/a | In Furrow |
|   | FERT | Ligand | 8 | oz/a | In Furrow |
| 8 | FERT | 10-34-0 | 5.95 | gal/a | In Furrow |
|   | FERT | Ligand | 8 | oz/a | In Furrow |
| 9 | FERT | 10-34-0 | 5.7 | gal/a | In Furrow |
|   | FERT | Blue Tsunami | 1 | qt/a | In Furrow |
|   | FERT | Ligand | 8 | oz/a | In Furrow |
| 10 | FERT | 10-34-0 | 5.7 | gal/a | In Furrow |
|   | FERT | Blue Tsunami | 1 | qt/a | In Furrow |
|   | FERT | Ligand | 8 | oz/a | In Furrow |
|   | FERT | Torque HC | 1.0 | oz/a | In Furrow |
| 11 | INSE | Capture LFR | 8.5 | oz/a | In Furrow |
|   | FERT | Water | 5.9 | gal/a | In Furrow |
| 12 | FERT | Redline | 3 | gal/a | In Furrow |
|   | INSE | Capture LFR | 8.5 | oz/a | In Furrow |
|   | FERT | Water | 2.9 | gal/a | In Furrow |
| 13 | CHK | Untreated Check |   |   |   |

Corn plants were harvested on Oct. 10, 2012. Thereafter, the yield of corn plants administered the composition comprising ortho-ortho EDDHA was compared to the yield of control corn plants that were untreated. Corn plants administered the composition comprising ortho-ortho EDDHA exhibited a yield increase of 8.5 bushels per acre compared to untreated controls.

The yield of corn plants administered the composition comprising ortho-ortho EDDHA and further comprising 10-34-0 fertilizer via tankmixing was compared to the yield of corn plants that were administered 10-34-0 fertilizer alone. Corn plants administered the composition comprising ortho-ortho EDDHA plus 10-34-0 fertilizer exhibited a yield increase of 4 bushels per acre compared to corn plants administered 10-34-0 fertilizer alone.

The yield of corn plants administered the composition comprising ortho-ortho EDDHA and further comprising 10-34-0 fertilizer and a chelated zinc (Blue Tsunami) via tankmixing was compared to the yield of corn plants that were administered 10-34-0 fertilizer and chelated zinc via tankmixing. Corn plants administered the composition comprising ortho-ortho EDDHA plus 10-34-0 fertilizer and chelated zinc exhibited a yield increase of 1.2 bushels per acre compared to corn plants administered 10-34-0 fertilizer and chelated zinc alone.

EXAMPLE 3

2012 Soybean Trial—Rochester, Minn.

A soybean trial utilizing a composition of the instant disclosure was performed in Rochester, Minn., in 2012. In this example, the composition comprised ortho-ortho EDDHA as the exemplary ligand.

In this example, *glycine max* (variety Stine 19RA 02) soybean seeds were planted on May 9, 2012. The seed bed was smooth. The treated crop area for the instant example was 300 square feet ($ft^2$). The study design was randomized complete block (RCB) with four replications. A total of 10 treatments were performed.

Soybean plants were harvested and, thereafter, the yield of soybean plants administered the composition comprising ortho-ortho EDDHA and further comprising glyphosate (Buccaneer Plus) and a water conditioning agent (N-Tense) via tankmixing was compared to the yield of soybean plants that were administered glyphosate and a water conditioning agent via tankmixing. Soybean plants administered the composition comprising ortho-ortho EDDHA plus glyphosate and a water conditioning agent exhibited a yield increase of 5.7 bushels per acre compared to soybean plants administered glyphosate and a water conditioning agent alone.

EXAMPLE 4

2013 Corn Trial—Casselton, N. Dak.

A corn trial utilizing a composition of the instant disclosure was performed near Chaffee, N. Dak., in 2013. In this example, the composition comprised ortho-ortho EDDHA as the exemplary ligand.

Planting was arranged in a randomized complete block design with four replications. Individual treatment plots measured 11 feet wide and 30 feet long. Due to dry conditions in spring 2013, there was some uneven germination but overall plant stands were good.

In this example, corn variety Pioneer 8640 Roundup Ready was planted on May 13, 2013 using a John Deere MaxEmerge II planter. Corn was planted 2 inches deep to a population of 35,000 plants per acre, and a 22-inch row spacing was used. Roundup herbicide was applied once for weed control. Plots were not cultivated and some late hand labor was used as needed for weed control.

Soil nitrogen levels were adjusted with fertilizer to approximately 200 lbs/acre of available residual soil test plus added fertilizer N. A total of 8 treatments were performed, as shown in Table 2.

TABLE 2

Treatment Descriptions.

| Treatment No. | Type | Treatment Name | Rate | Unit | Description |
|---|---|---|---|---|---|
| 1 | CHK | Untreated Check | | | |
| 2 | FERT | 10-34-0 | 5 | gal/a | In Furrow |
| 3 | FERT | Ligand | 3 | gal/a | In Furrow |
| 4 | FERT | 10-34-0 | 5 | gal/a | In Furrow |
|   | FERT | Blue Tsunami | 1 | qt/a | In Furrow |
| 5 | FERT | Ligand | 8 | gal/a | In Furrow |
| 6 | FERT | 10-34-0 | 5 | gal/a | In Furrow |
|   | FERT | WC150 | | | In Furrow |
| 7 | FERT | 10-34-0 | 5 | gal/a | In Furrow |
|   | FERT | Blue Tsunami | 1 | qt/a | In Furrow |
|   | FERT | WC150 | | | In Furrow |
| 8 | FERT | 10-34-0 | 5 | gal/a | In Furrow |
|   | FERT | WC150 | | | In Furrow |

The yield of corn plants administered the composition comprising ortho-ortho EDDHA was compared to the yield of control corn plants that were untreated. Corn plants administered the composition comprising ortho-ortho EDDHA exhibited a yield increase of 4.6 bushels per acre compared to untreated controls.

The yield of corn plants administered the composition comprising ortho-ortho EDDHA and further comprising 10-34-0 fertilizer via tankmixing was compared to the yield of corn plants that were administered 10-34-0 fertilizer alone. Corn plants administered the composition comprising ortho-ortho EDDHA plus 10-34-0 fertilizer exhibited a yield increase of 25.4 bushels per acre compared to corn plants administered 10-34-0 fertilizer alone.

The yield of corn plants administered the composition comprising ortho-ortho EDDHA and further comprising 10-34-0 fertilizer and a chelated zinc (Blue Tsunami) via tankmixing was compared to the yield of corn plants that were administered 10-34-0 fertilizer and chelated zinc via tankmixing. Corn plants administered the composition comprising ortho-ortho EDDHA plus 10-34-0 fertilizer and chelated zinc exhibited a yield increase of 34.1 bushels per acre compared to corn plants administered 10-34-0 fertilizer and chelated zinc alone.

EXAMPLE 5

2013 Corn Trial—Brookings, S. Dak.

A corn trial utilizing a composition of the instant disclosure was performed near Brookings, S. Dak., in 2013. In this example, the composition comprised ortho-ortho EDDHA as the exemplary ligand.

In this example, corn variety Dekalb 45-51 was planted on May 14, 2013. Corn was planted to a population of 32,000 plants per acre, and a 30-inch row spacing was used. The soil type was Brandt silty clay loam. A total of 8 treatments were performed, as shown in Table 3.

TABLE 3

Treatment Descriptions.

| Treatment No. | Type | Treatment Name | Rate | Unit | Description |
|---|---|---|---|---|---|
| 1 | CHK | Untreated Check | | | |
| 2 | FERT | 10-34-0 | 5 | gal/a | In Furrow |
| 3 | FERT | WC139 | 3 | gal/a | In Furrow |
| 4 | FERT | 10-34-0 | 5 | gal/a | In Furrow |
|   | FERT | Blue Tsunami | 1 | qt/a | In Furrow |
| 5 | FERT | Ligand | 8 | oz/a | In Furrow |
| 6 | FERT | 10-34-0 | 5 | gal/a | In Furrow |
|   | FERT | Ligand | 8 | oz/a | In Furrow |
| 7 | FERT | 10-34-0 | 5 | gal/a | In Furrow |
|   | FERT | Blue Tsunami | 1 | qt/a | In Furrow |
|   | FERT | Ligand | 8 | oz/a | In Furrow |
| 8 | FERT | WC139 | 3 | gal/a | In Furrow |
|   | FERT | WC171 | 0.1 | oz/a | In Furrow |

Corn plants were harvested on Oct. 24, 2013. Thereafter, the yield of corn plants administered the composition comprising ortho-ortho EDDHA was compared to the yield of control corn plants that were untreated. Corn plants administered the composition comprising ortho-ortho EDDHA exhibited a yield increase of 8.2 bushels per acre compared to untreated controls.

The yield of corn plants administered the composition comprising ortho-ortho EDDHA and further comprising 10-34-0 fertilizer and a chelated zinc (Blue Tsunami) via tankmixing was compared to the yield of corn plants that were administered 10-34-0 fertilizer and chelated zinc via tankmixing. Corn plants administered the composition comprising ortho-ortho EDDHA plus 10-34-0 fertilizer and chelated zinc exhibited a yield increase of 20.6 bushels per acre compared to corn plants administered 10-34-0 fertilizer and chelated zinc alone.

EXAMPLE 6

2013 Soybean Trial—St. Cloud, Minn.

A soybean trial utilizing a composition of the instant disclosure was performed in St. Cloud, Minn., in 2013. In this example, the composition comprised ortho-ortho EDDHA as the exemplary ligand.

In this example, *glycine max* (variety PB0954RR) soybean seeds were planted on Jun. 17, 2013. The tillage type was conventional till. The treated crop area for the instant example was 300 square feet ($ft^2$). The study design was randomized complete block (RCB) with four replications. A total of 6 treatments were performed, as shown in Table 4.

TABLE 4

Treatment Descriptions.

| Treatment No. | Type | Treatment Name | Rate | Unit | Description |
|---|---|---|---|---|---|
| 1 | CHK | Untreated Check | | | |
| 2 | FERT | WC139 | 2 | gal/a | In Furrow |
| 3 | FERT | WC139 | 3 | gal/a | In Furrow |
| 4 | FERT | Ligand | 12 | oz/a | In Furrow |
| 5 | FERT | WC150 | 2 | lb/a | In Furrow |
| 6 | FERT | 10-34-0 | 2 | gal/a | In Furrow |

Soybean plants were harvested on Oct. 11, 2013. Thereafter, yield of soybean plants administered the composition comprising ortho-ortho EDDHA was compared to the yield of control soybean plants that were untreated. Soybean plants administered the composition comprising ortho-ortho EDDHA exhibited a yield increase of 5.1 bushels per acre compared to untreated controls.

EXAMPLE 7

2013 Soybean Trial—Rochester, Minn.

A soybean trial utilizing a composition of the instant disclosure was performed in Rochester, Minn., in 2013. In this example, the composition comprised ortho-ortho EDDHA as the exemplary ligand.

In this example, DuPont (Pioneer 92Y22) soybean seeds were planted on May 16, 2013. The seed bed was medium. The treated crop area for the instant example was 250 square feet ($ft^2$). The study design was randomized complete block (RCB) with four replications.

Soybean plants were harvested and, thereafter, the yield of soybean plants administered the composition comprising ortho-ortho EDDHA and further comprising glyphosate (Buccaneer Plus) and a water conditioning agent (N-Tense) via tankmixing was compared to the yield of soybean plants that were administered glyphosate and a water conditioning agent via tankmixing. Soybean plants administered the composition comprising ortho-ortho EDDHA plus glyphosate and a water conditioning agent exhibited a yield increase of 2 bushels per acre compared to soybean plants administered glyphosate and a water conditioning agent alone.

EXAMPLE 8

2013 Soybean Trial—Arlington, Wis.

A soybean trial utilizing a composition of the instant disclosure was performed in Arlington, Wis., in 2013. In this example, the composition comprised ortho-ortho EDDHA as the exemplary ligand.

In this example, *glycine max* (variety Asgrow 2130) soybean seeds were planted on Jun. 1, 2013. The tillage type was conventional till. The treated crop area for the instant example was 250 square feet ($ft^2$). The study design was randomized complete block (RCB) with four replications. A total of 12 treatments were performed.

Soybean plants were harvested and, thereafter, the yield of soybean plants administered the composition comprising ortho-ortho EDDHA and further comprising glyphosate (Buccaneer Plus) and a water conditioning agent (N-Tense) via tankmixing was compared to the yield of soybean plants that were administered glyphosate and a water conditioning agent via tankmixing. Soybean plants administered the composition comprising ortho-ortho EDDHA plus glyphosate and a water conditioning agent exhibited a yield increase of 8 bushels per acre compared to soybean plants administered glyphosate and a water conditioning agent alone.

EXAMPLE 9

2013 Corn Seed Trial—Brookings, S. Dak.

A corn seed trial utilizing a composition of the instant disclosure was performed in Brookings, S. Dak., in 2013. In this example, the composition comprised ortho-ortho EDDHA as the exemplary ligand (i.e., "WC101").

The study design was randomized complete block (RCB) with four replications. As shown in Table 5, a total of 3 treatments were performed in 4 plots for each treatment group.

TABLE 5

Treatment Descriptions.

| Treatment No. | Type | Treatment Name | Plot No. (Rep 1) | Plot No. (Rep 2) | Plot No. (Rep 3) | Plot No. (Rep 4) |
|---|---|---|---|---|---|---|
| 1 | CHK | Untreated Check | 101 | 201 | 301 | 401 |
| 2 | Seed Treatment | WC101 | 102 | 202 | 302 | 402 |
| 3 | Seed Treatment | WC101 + WC143 | 103 | 203 | 303 | 403 |

Figure 9:
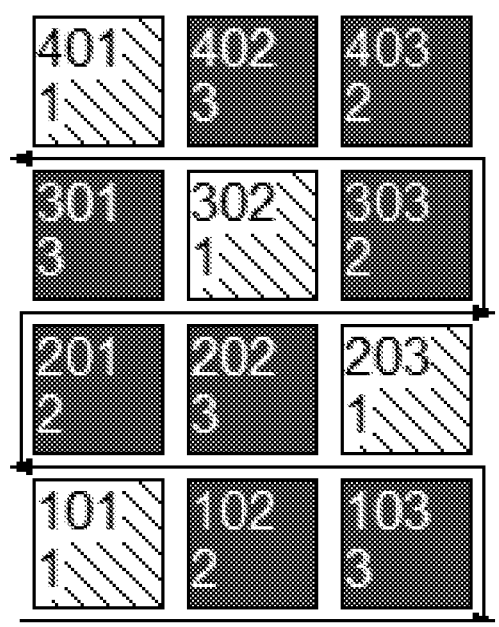
FIG. 9 shows that plot unit sizes were approximately 10 feet by 40 feet according to the disclosed layout.

Plot unit sizes were approximately 10 feet by 40 feet according to the disclosed layout of FIG. 9.

The yield of corn seeds administered the composition comprising ortho-ortho EDDHA was compared to the yield of control corn seeds that were untreated. Treatment of corn seeds administered the composition comprising ortho-ortho EDDHA exhibited a yield increase of 1.4 bushels per acre compared to untreated controls.

In addition, the emergence of corn seeds administered the composition comprising ortho-ortho EDDHA was compared to the emergence of control corn seeds that were untreated.

Treatment of corn seeds administered the composition comprising ortho-ortho EDDHA exhibited an emergence increase by 3.5% compared to untreated controls.

The yield of corn seeds administered the composition comprising ortho-ortho EDDHA and further comprising a micronutrient product was compared to the yield of control corn seeds that were untreated. Treatment of corn seeds administered the composition comprising ortho-ortho EDDHA and the micronutrient product exhibited a yield increase of 9.5 bushels per acre compared to untreated controls.

Furthermore, the emergence of corn seeds administered the composition comprising ortho-ortho EDDHA and further comprising a micronutrient product (WC143) was compared to the emergence of control corn seeds that were untreated. Treatment of corn seeds administered the composition comprising ortho-ortho EDDHA and the micronutrient product exhibited an emergence increase by 5.5% compared to untreated controls.

EXAMPLE 10

2014 Corn Trial—Scandia, Kans.

A corn trial utilizing a composition of the instant disclosure was performed near Scandia, Kans., in 2014. In this example, the composition comprised ortho-ortho EDDHA as the exemplary ligand (i.e., "WC101").

In this example, corn was planted on May 2, 2014. Treatments were applied as starter applications at planting with an application volume of 6 gpa. Treatments were performed as shown in Table 6. Weed control was completed as needed to keep weed free with maintenance sprays.

TABLE 6

Treatment Descriptions.

| Treatment No. | Type | Treatment Name | Rate | Unit | Description |
|---|---|---|---|---|---|
| 1 | CHK | Untreated Check | 0 | | |
| 2 | FERT | 10-34-0 | 5 | gal/a | In Furrow |
| 3 | FERT | WC139 | 3 | gal/a | In Furrow |
| 4 | FERT | 10-34-0 | 5 | gal/a | In Furrow |
| | FERT | Blue Tsunami | 1 | qt/a | In Furrow |
| 5 | FERT | 10-34-0 | 5 | gal/a | In Furrow |
| | FERT | Ligand | 24 | oz/a | In Furrow |
| 6 | FERT | Local P Starter (9-18-9) | 3 | gal/a | In Furrow |
| 7 | FERT | Local P Starter (9-18-9) | 3 | gal/a | In Furrow |
| | FERT | Ligand | 24 | oz/a | In Furrow |
| 8 | FERT | 10-34-0 | 5 | gal/a | In Furrow |
| | FERT | Aventine | 2 | qt/a | In Furrow |
| 9 | FERT | 10-34-0 | 5 | gal/a | In Furrow |
| | FERT | Blue Tsunami | 1 | qt/a | In Furrow |
| | FERT | WC101 | 24 | oz/a | In Furrow |
| 10 | FERT | 10-34-0 | 5 | gal/a | In Furrow |
| | FERT | Aventine | 2 | qt/a | In Furrow |
| | FERT | WC101 | 24 | oz/a | In Furrow |
| 11 | FERT | WC150 | 8 | oz/a | In Furrow |
| 12 | FERT | 10-34-0 | 5 | gal/a | In Furrow |
| | FERT | Blue Tsunami | 1 | qt/a | In Furrow |
| | FERT | WC150 | 8 | oz/a | In Furrow |

Preliminary soil test values were collected for each replication and indicated a low soil test P that should be conducive to corn response to starter P application. Other parameters including K, Zn and soil pH were evaluated to be at optimum condition, and there was no need for additional fertilization. The soil tests by replication in the study area are shown in Table 7.

Data collected included yield (bu/acre), test weight, moisture, preliminary soil analysis, and plant tissue and grain analysis. Grain yield was measured harvesting the two center rows with a plot combine. Total phosphorus (P) content in plant tissue was measured for the ear leaf and grain P concentration was measured after harvest with grain analysis for total P content.

TABLE 7

Soil tests by replication in the study area.

| Replication | pH | Mehlich P (ppm) | K (ppm) | OM (%) | Zn (ppm) |
|---|---|---|---|---|---|
| 1 | 6.37 | 12.5 | 600 | 2.9 | 2.1 |
| 2 | 6.28 | 13.1 | 630 | 3.0 | 2.2 |
| 3 | 6.44 | 15.2 | 640 | 3.0 | 2.3 |
| 4 | 6.35 | 14.1 | 670 | 3.0 | 2.6 |
| Average | 6.36 | 14.1 | 670 | 3.0 | 2.3 |

Fertilizer treatment mixes were completed before application. Visual observations in some instances indicated possible compatibility issues with WC101 product and various fertilizers, for instance 9-18-9. Although treatment application was complicated in some instances, the rates and placement for the instant example were believed to be within acceptable parameters. Grain yield was measured harvesting the two center rows with a plot combine. Total phosphorus (P) content in plant tissue was measured for the ear leaf and grain P concentration was measured after harvest with grain analysis for total P content.

As shown in Table 8, each evaluated parameter demonstrated a statistically significant effect for ligand-treated plants compared to control treatment.

TABLE 8

Statistical significance of treatment effects.
Type III Tests of Fixed Effects

| Effect | Num DF | Den DF | F Value | Pr > F |
|---|---|---|---|---|
| Yield | 11 | 33 | 2.80 | 0.011 |
| Tissue P | 11 | 33 | 1.94 | 0.070 |
| Grain P Removal | 11 | 33 | 2.75 | 0.012 |

Figure 2:
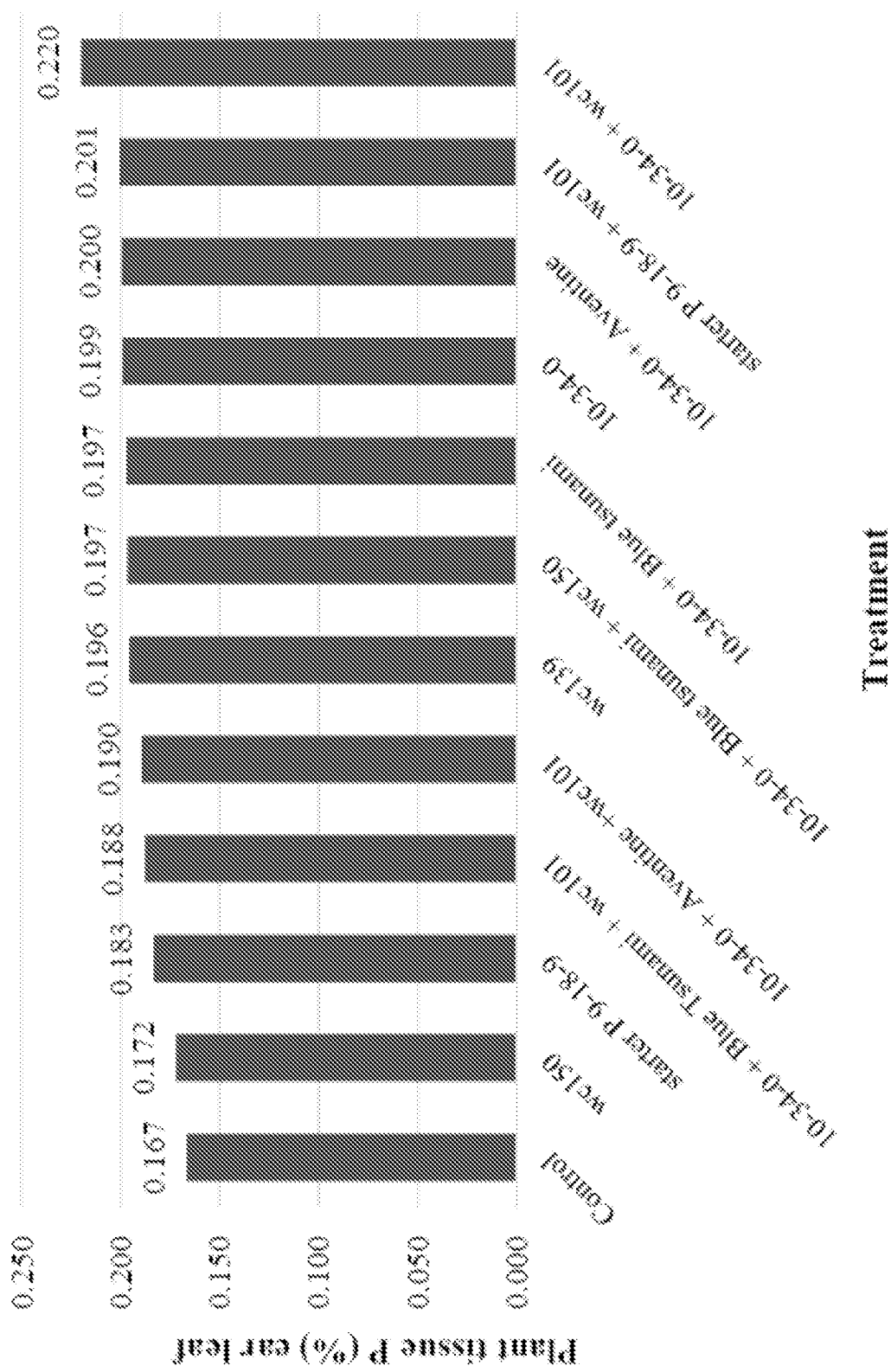
FIG. 2 shows the plant tissue phosphorus (P) response (percentage present in ear leaf) to starter fertilizer treatment groups, sorted by yield level.
Figure 3:
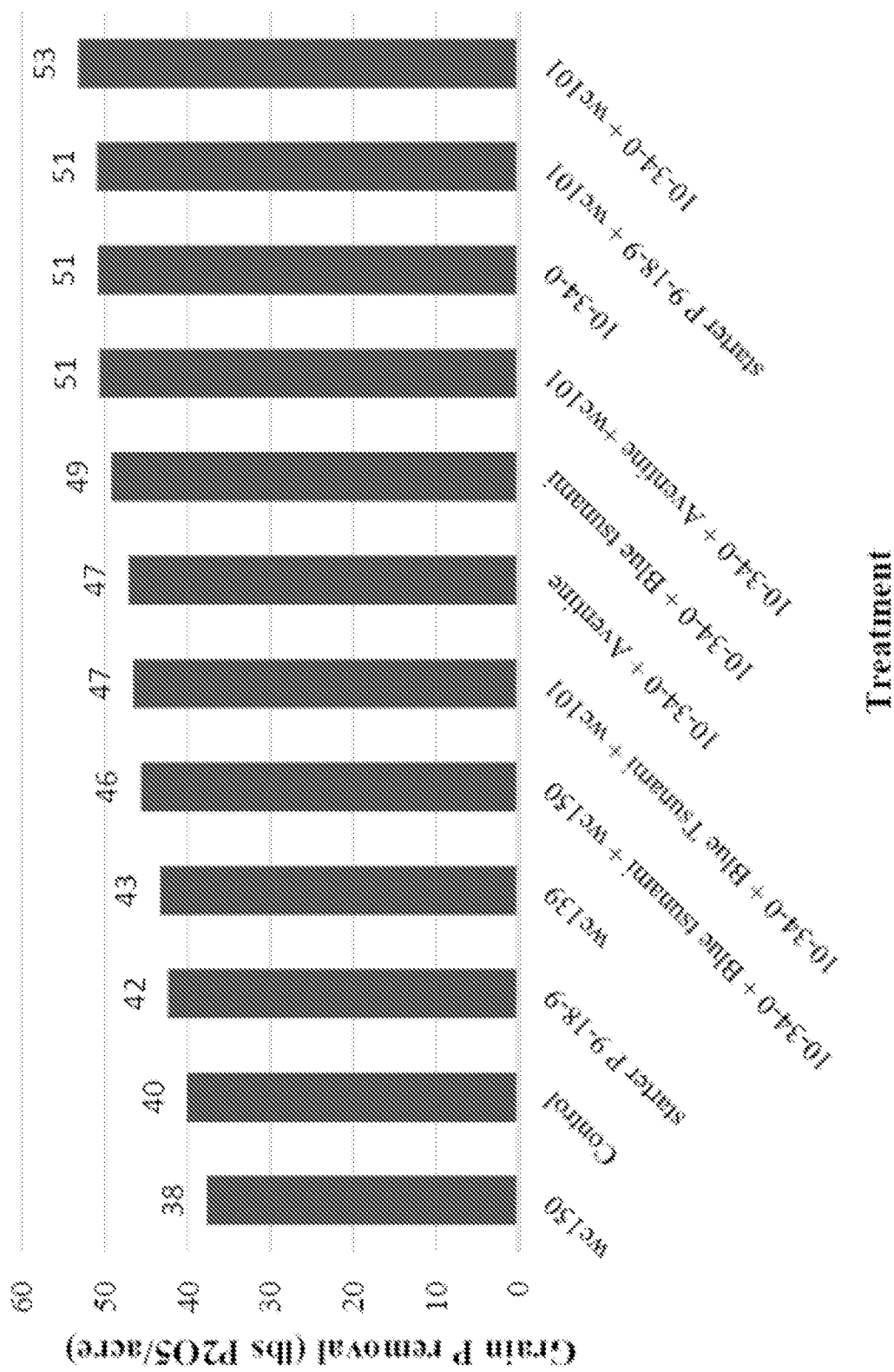
FIG. 3 shows the grain (P) removal response (pounds of P2O5/acre) to starter fertilizer treatment groups, sorted by yield level.

As shown in FIG. 1, grain yield increased approximately 25 bushels per acre with the highest yielding treatment compared to control treatment. Furthermore, FIG. 2 and FIG. 3 demonstrate superior effects for tissue P uptake and grain P uptake, respectfully, compared to control treatment. As shown in FIGS. 1-3, inclusion of WC101 in the treatment groups resulted in an improvement for each evaluated parameter, especially for treatment groups that do not include micronutrients (e.g., 10-34-0 and 9-18-9).

EXAMPLE 11

Laboratory Soil Micronutrient Recovery Experiment

A soil micronutrient recovery trial utilizing a composition of the instant disclosure was performed in the laboratory. In this example, the composition comprised ortho-ortho EDDHA as the exemplary ligand (i.e., "WC101").

The objective of the instant example was to demonstrate the percentage recovery (i.e., % availability) over time of micronutrients present in various soil types. Three soil types were tested: (1) Pullman series, (2) Amarillo series, and (3)

Olton series. The soil types are alkaline (pH>7.5) semi-arid soils and are often calcareous in nature. Furthermore, the chemistry of these soils indicate that micronutrients could be tied up easily by soil constituents, thereby reducing micronutrient availability to plants.

Approximately 500 grams of each soil type was incubated in a plastic container. WC101 was applied to the soil types, and treated soils were incubated for approximately 60 days and sampled at 2-3 weeks intervals. DTPA extraction techniques was used to extract plant available micronutrients (Fe, Cu, Mn, and Zn). Plant available soil P was determined in Mehlich-3 extracts. Elemental analysis was conducted using the ICP.

Figure 4:
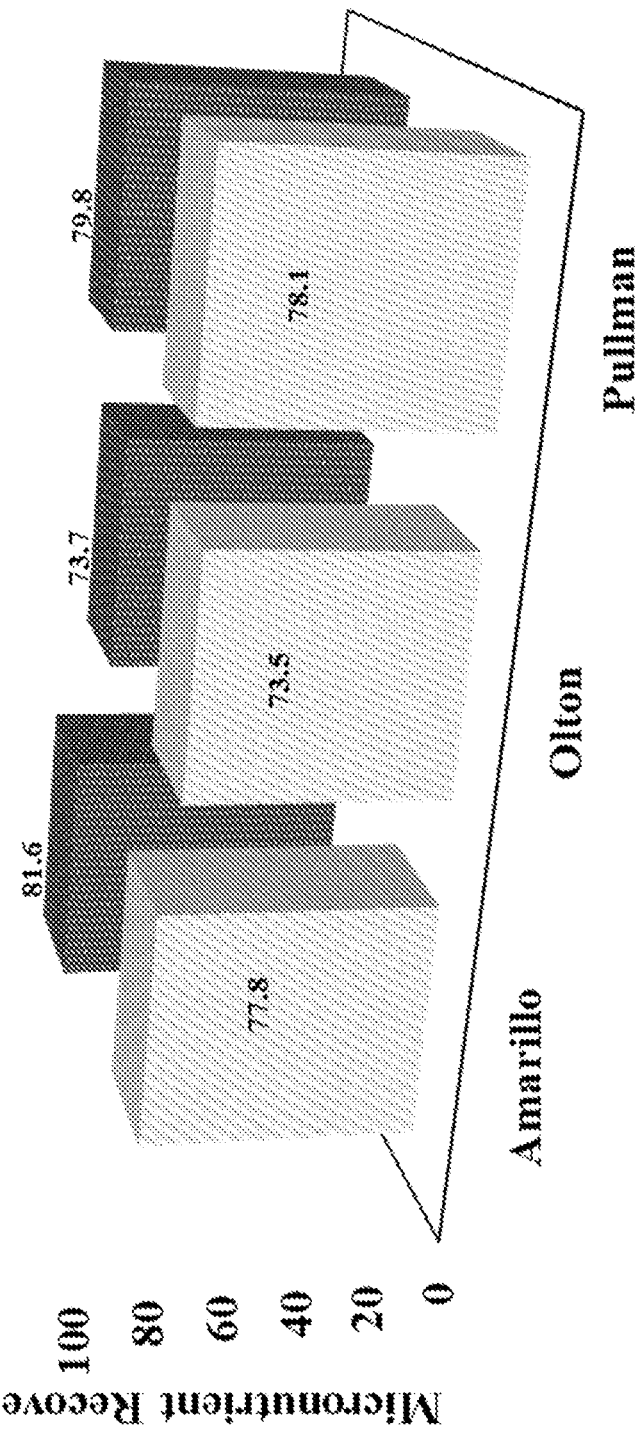
FIG. 4 shows the effects of ligand (WC101) treatment on the percentage of copper (Cu) recovery 35 days after its addition to the three different soil types.
Figure 5:
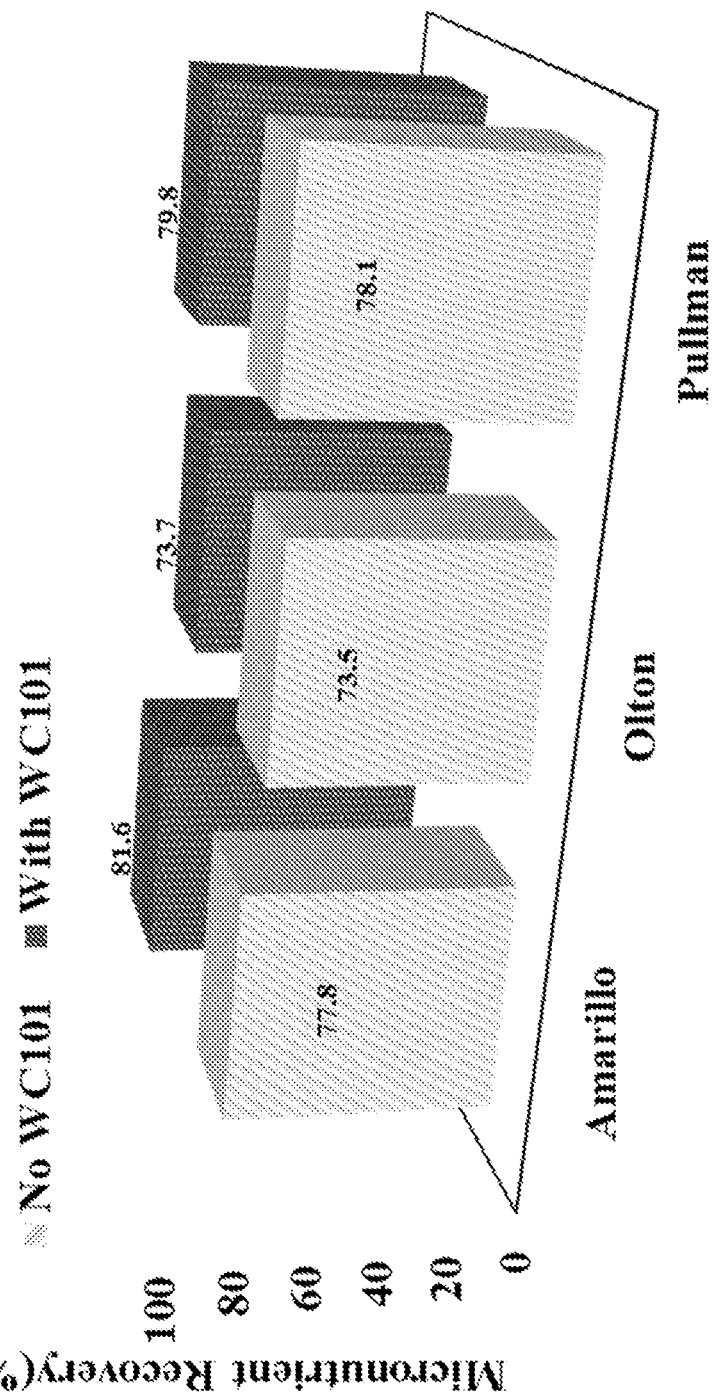
FIG. 5 shows the effects of ligand (WC101) treatment on the percentage of iron (Fe) recovery 35 days after its addition to the three different soil types.
Figure 6:
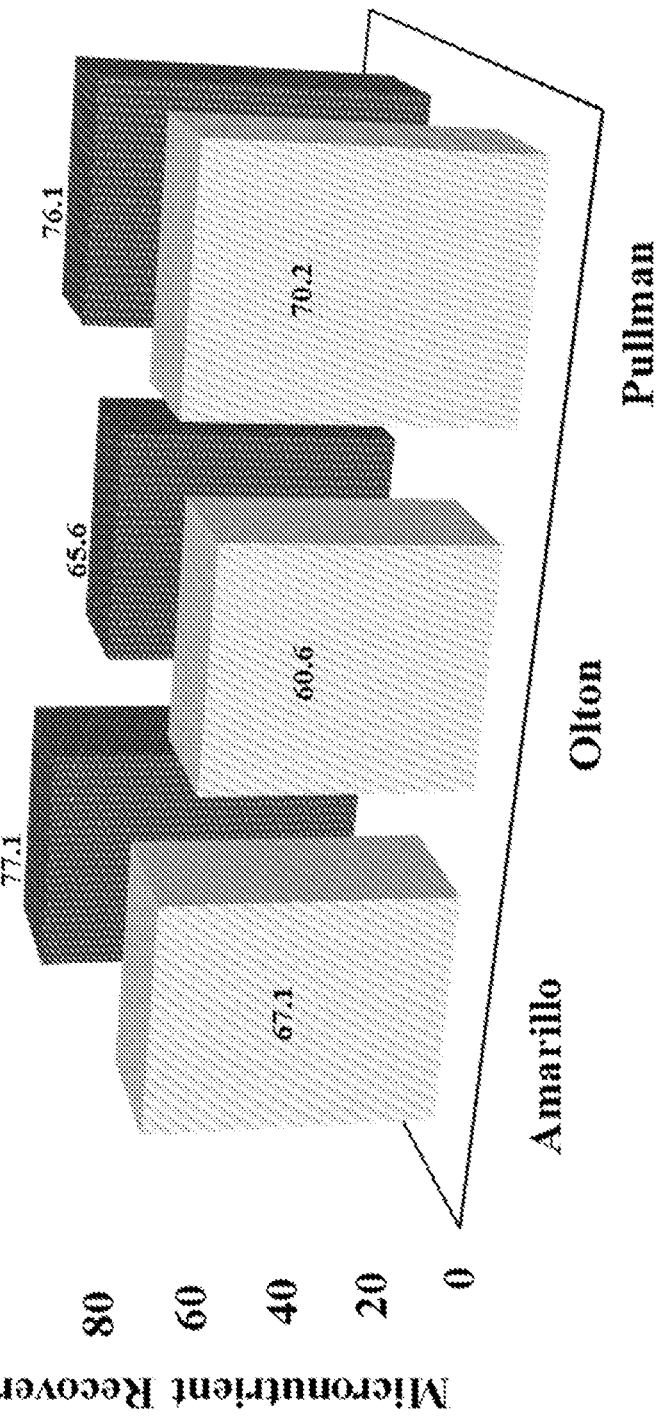
FIG. 6 shows the effects of ligand (WC101) treatment on the percentage of manganese (Mn) recovery 35 days after its addition to the three different soil types.
Figure 7:
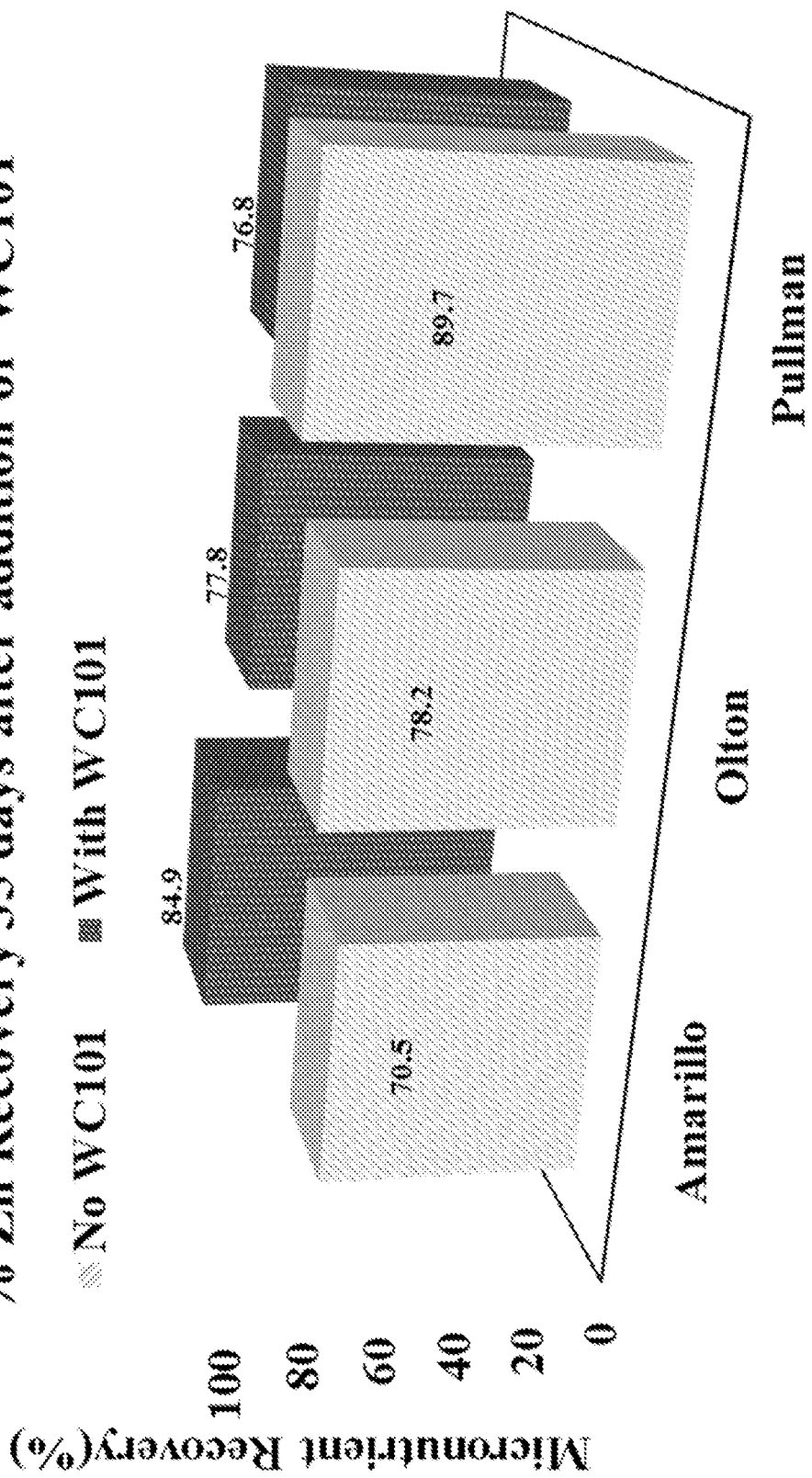
FIG. 7 shows the effects of ligand (WC101) treatment on the percentage of zinc (Zn) recovery 35 days after its addition to the three different soil types.
Figure 8:
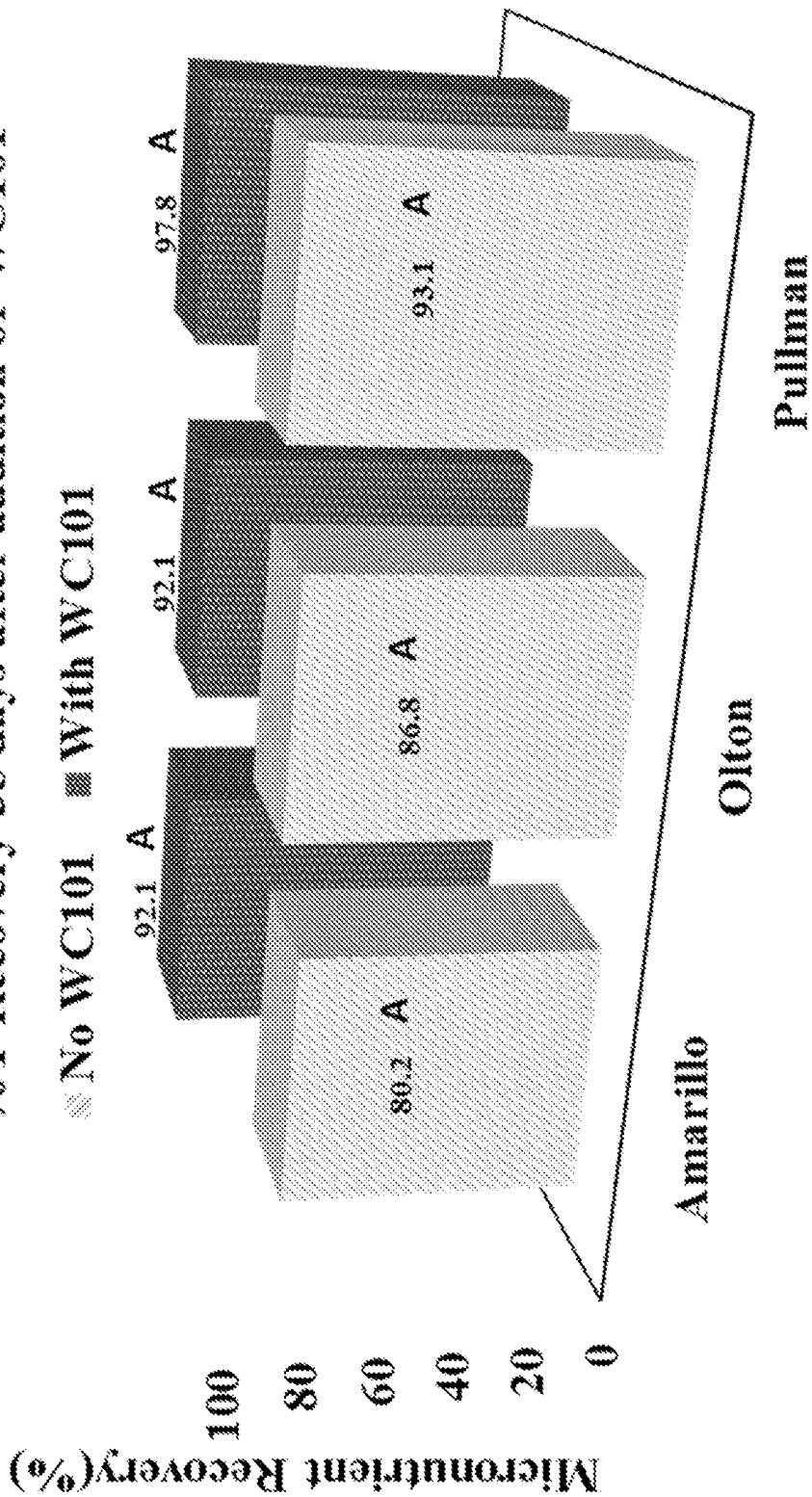
FIG. 8 shows the effects of ligand (WC101) treatment on the percentage of phosphorus (P) recovery 35 days after its addition to the three different soil types. Mean values with the same letter are not statistically different (Fisher's LSD, α=0.05).

FIGS. 4-8 show the effects of WC101 treatment on the various soil types. In FIG. 4, WC101 treatment was effective to increase the percentage of copper (Cu) recovery 35 days after the addition of WC101 to the soil types. In FIG. 5, WC101 treatment was effective to increase the percentage of iron (Fe) recovery 35 days after the addition of WC101 to the soil types. In FIG. 6, WC101 treatment was effective to increase the percentage of manganese (Mn) recovery 35 days after the addition of WC101 to the soil types. In FIG. 7, WC101 treatment was effective to increase the percentage of zinc (Zn) recovery 35 days after the addition of WC101 to the soil types. In FIG. 8, WC101 treatment was effective to increase the percentage of phosphorus (P) recovery 35 days after the addition of WC101 to the soil types.

What is claimed is:

1. A composition comprising a ligand and a fertilizer, wherein the ligand is ortho-ortho EDDHA, wherein the ligand is non-chelated,
   wherein the composition further comprises zinc, and
   wherein the composition is substantially free of iron.
2. The composition of claim 1 wherein the composition further comprises a herbicide.
3. The composition of claim 1 wherein the composition further comprises a water conditioning agent.
4. The composition of claim 1 wherein the composition further comprises a micronutrient product.
5. The composition of claim 1 wherein the fertilizer is an ammonium polyphosphate fertilizer.
6. The composition of claim 5 wherein the ammonium polyphosphate fertilizer is ammonium polyphosphate 10-34-0 fertilizer.
7. The composition of claim 1 wherein the zinc is chelated zinc.
8. The composition of claim 2 wherein the herbicide is glyphosate.

* * * * *